Feb. 9, 1926.
W. J. LANGSTROTH
1,572,152
MILK BOTTLE SUPPORT
Original Filed Dec. 31, 1923
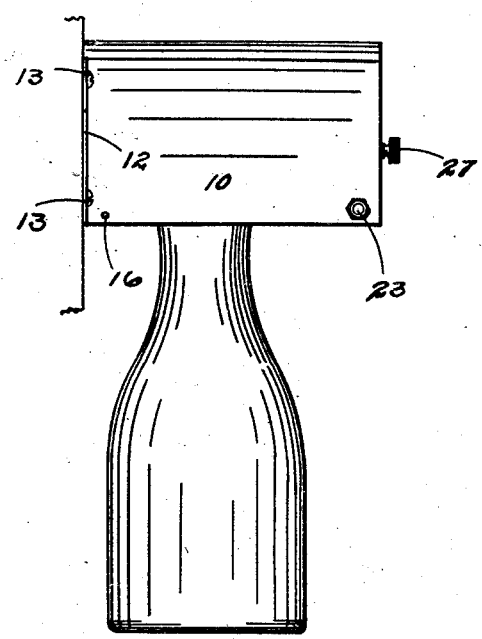
Fig. 1.
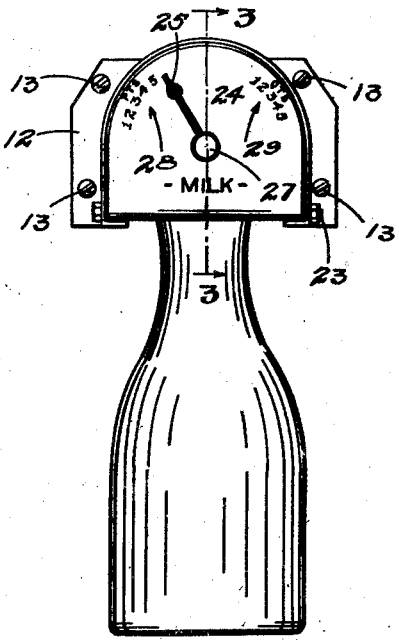
Fig. 2.
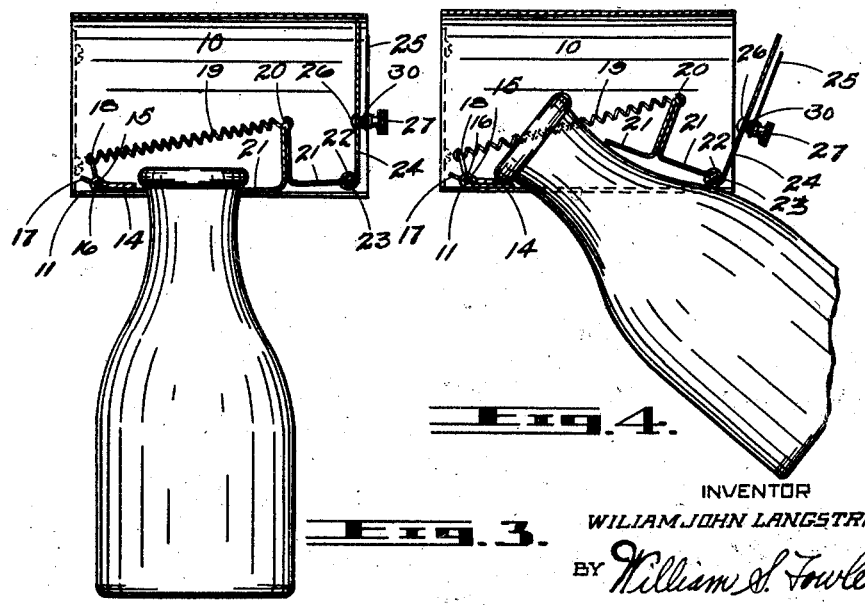
Fig. 4.
Fig. 3.
INVENTOR
WILIAM JOHN LANGSTROTH
BY William S. Fowler,
ATTORNEY Patented Feb. 9, 1926.

1,572,152

UNITED STATES PATENT OFFICE.

WILLIAM JOHN LANGSTROTH, OF LONDON, ONTARIO, CANADA.

MILK-BOTTLE SUPPORT.

Application filed December 31, 1923, Serial No. 683,728. Renewed December 28, 1925.

*To all whom it may concern:*

Be it known that I, WILLIAM JOHN LANGSTROTH, a citizen of Dominion of Canada, and resident of London, in the county of Middlesex and Province of Ontario, Dominion of Canada, have invented certain new and useful Improvements in a Milk-Bottle Support, of which the following is a specification.

This invention has relation to certain new and useful improvements in a milk bottle support and has for its primary object the provision of a device of the character stated which is of simple and inexpensive construction as well as highly efficient in use and will automatically grip and hold the milk bottle when engaged therewith.

Another object of the invention resides in the provision of a milk bottle support constructed in such a manner that the milk bottle may be readily engaged with or disengaged from the support and in which the operation will open the ticket and coin pocket at the front of the support.

The invention has for a further object the provision of a milk bottle support of the character stated including a pair of hinged clamping members resiliently connected and normally retained in operative position but adapted to be actuated by the milk bottle when the latter is being inserted or removed.

A still further object of the invention resides in the provision of a milk bottle support of the character stated, in which the top of the milk bottle is enclosed by the casing or body of the support and the bottle suspended between a pair of hinged plates, one of which carries the front end plate of the support, on which the indicator is provided and also forms the compartment for tickets and change which may be presented to the operator as the end of the milk bottle is inserted or removed from its position between the hinged clamping plates.

With the foregoing and other objects in view, as will appear as the description proceeds the invention consists in the novel construction, combination and arrangement of co-operating elements as hereinafter more specifically set forth, claimed and shown in the accompanying drawings forming a part of the present application, in which:

Fig. 1 is a side elevation of the support in use.

Fig. 2 is a front elevation thereof.

Fig. 3 is an enlarged longitudinal vertical section, substantially on the plane of line 3—3 of Fig. 2, looking in the direction indicated by the arrows.

Fig. 4 is a view similar to Fig. 3, showing the milk bottle partially withdrawn.

Referring more in detail to the drawings in which similar reference characters designate corresponding parts throughout the several views, it will be noted that the milk bottle support includes a body or casing 10 which is preferably composed of a sheet of metal or other material curved to provide the transversely curved top and depending parallel sides, as shown in Figs. 1 and 2. The longitudinal edges of the material are inturned to provide the inwardly directed longitudinal flanges 11 at the bottom and along the sides of the casing or covering. Extensions are also provided at the rear end of the casing or cover and bent outwardly to form oppositely directed side flanges 12, through which securing members 13 may be extended to fasten the support at the rear end of the casing or cover on the wall or other stationary and permanent support. This also will be clearly seen in Figs. 1 and 2.

A rear clamping plate 14 is mounted in the bottom of the casing or cover 10 and is composed of a plate bent upon itself intermediate its forward and rear ends to form the hinge 15 engaged around the rear transverse hinged pin 16, which latter has its opposite ends mounted in the sides of the casing or cover 10, near the rear lower corner thereof. This permits the main or lower leaf of the clamping plate 14 to normally rest by its side edges on the inturned flanges 11, as shown clearly in Fig. 3. The clamping plate 14 has stop lugs 17 struck from the same and extended rearwardly for engagement with the inturned side flanges 11 to limit upward swinging movement of the clamping plate 14 on the hinge pin 16. An additional lug 18 is also extended from the hinge 15 of the clamping plate 14 to receive and hold the rear end of the forwardly inclined spring 19, which latter has its forward end secured to the upwardly pressed portion 20 of the forward clamping plate 21, as shown clearly in Fig. 3.

In order to mount the forward clamping plate 21 in the forward lower portion of the body or casing 10, a portion of the clamping plate 21 is bent upon itself to form the hinge 22 extended around and beneath the forward hinge pin 23, which latter is extended transversely through the forward lower corner of the casing or cover 10, with the ends of the hinge pin 23 supported in the sides of the casing or cover 10. The forward clamping plate 21 is then extended upwardly to form the front end plate 24 which fits into and closes the front end of the casing or cover 10. A suitable indicator or pointer 25 works on the central pivot 26 having the operating knob 27 on its outer end, the central pivot 26 being extended through the front end plate 24. The indicator 25 may be readily positioned opposite the desired numerals 28 or the numerals 29 on the outer face of the front end plate 24 and indicating, respectively, pints or quarts as marked on the front end plate 24, as shown clearly in Fig. 2. It will also be seen from Fig. 3, that the spring 30 or the like may be employed for resiliently retaining the central pivot pin 26 against rotation, thereby eliminating danger of accidental movement of the indicator 25 from its set position. It is to be further understood that the upwardly pressed portion 20 of the forward clamping plate 21 is produced by bending the plate upon itself, as shown in Fig. 3. This view also makes it clear that the main portion of the forward clamping plate 21 normally rests on the side flanges 11 and in alignment with the main portion of the rear clamping plate 14. The ticket and change pocket 31 is formed by the upwardly pressed portion 20 of the forward clamping plate 21, and the front end plate 24 and the portion 32 of the forward clamping plate 21 located between the upwardly pressed portion 20 and the front end plate 24. Furthermore, the hinge 22 forms part of the bottom of the ticket and change pocket 31. However, when the forward clamping plate 21 is swung upon its hinge 22 and the hinge pin 23, the front end plate 24 swings outwardly and opens up the ticket and change pocket 31.

It is believed the complete construction and operation of the milk bottle may now be apparent from the foregoing paragraphs taken in connection with the accompanying drawings, without further detail description. It may be briefly stated, however, that when it is desired to engage the milk bottle with the support, it is simply necessary to place the milk bottle beneath the support and force the same upwardly against the rear clamping plate 14, or the forward clamping plate 21, causing upward swinging movement of one or both of these clamping plates 14 and 21, on their respective hinge pins 16 and 23, until the annular flange around the top of the bottle passes above the clamping plates 14 and 21, permitting them to automatically return to their normal or closed positions, when they will thoroughly grip the milk bottle, around the neck thereof and firmly support the bottle with the upper end thereof enclosed and protected by the body or casing 10. When it is desired to remove the bottle, it is simply necessary to tilt the bottle upwardly, by drawing outwardly or forwardly the bottom of the same, thereby forcing upwardly the forward clamping plate 21 and releasing the bottle from the rear clamping plate 14, as shown clearly in Fig. 4. The bottle may then be completely withdrawn from the support by drawing downwardly and forwardly on the bottle, the forward clamping plate 21 again returning automatically to its normal or closed position. In both of the operations of inserting and removing the milk bottle, the ticket or coin pocket 31 is opened by the forward or upward swinging movement of the forward clamping plate 21 on its hinge pin 23, thereby permitting the ready insertion or removal of the ticket or coins.

What I claim as new is:

1. A bottle support of the character described including a casing having an open end; hinged bottle clamping members in said casing, one of which is provided with a coin and ticket pocket and closure means for the open end of said casing; said hinged bottle clamping members being adapted to swing upwardly when the neck of a bottle is forced into a removed from said casing and simultaneously tilt said closure means outwardly so that access may be had to the coins and tickets in said pocket.

2. A bottle support of the character described including a casing having an open end; hinged bottle clamping members in said casing, one of which is provided with a coin and ticket pocket and closure means for the end of said casing; said hinged bottle clamping members being adapted to swing upwardly when the neck of a bottle is forced into or removed from said casing and simultaneously tilt said closure means outwardly so that access may be had to the coins and tickets in said pocket, and a spring for normally retaining said closure means in closed position.

In testimony whereof, I affix my signature.

WILLIAM JOHN LANGSTROTH.